(12) United States Patent
Bulluck et al.

(10) Patent No.: US 7,014,790 B1
(45) Date of Patent: Mar. 21, 2006

(54) ROOM TEMPERATURE CURED HIGH TEMPERATURE AND LOAD DIMENSIONALLY STABLE ACRYLATE ADHESIVES

(75) Inventors: John Werner Bulluck, Spicewood, TX (US); Brad A. Rix, Spicewood, TX (US)

(73) Assignee: Texas Research International, Inc., Austin, TX (US)

( * ) Notice: Subject to any disclaimer, the term of this patent is extended or adjusted under 35 U.S.C. 154(b) by 0 days.

(21) Appl. No.: 10/706,148

(22) Filed: Nov. 12, 2003

Related U.S. Application Data

(63) Continuation of application No. 09/881,587, filed on Jun. 14, 2001, now Pat. No. 6,734,249.

(60) Provisional application No. 60/211,856, filed on Jun. 14, 2000.

(51) Int. Cl.
 *C09J 4/02* (2006.01)

(52) U.S. Cl. .................. 252/182.18; 524/556; 524/558; 524/559; 524/560; 526/230; 526/231.1

(58) Field of Classification Search .......... 252/182.18; 524/558, 559; 526/230, 232.1
See application file for complete search history.

(56) References Cited

U.S. PATENT DOCUMENTS

| | | | |
|---|---|---|---|
| 4,112,013 A | 9/1978 | Briggs et al. | 260/878 |
| 4,126,504 A | 11/1978 | Wolinski et al. | 156/310 |
| 4,263,419 A | 4/1981 | Piestert et al. | 525/305 |
| 4,581,427 A * | 4/1986 | Dunn et al. | 526/147 |
| 5,191,039 A | 2/1993 | Maruno et al. | 525/531 |
| 5,204,378 A | 4/1993 | Maruno et al. | 522/39 |
| 5,346,640 A | 9/1994 | Leys | 252/162 |
| 5,865,936 A | 2/1999 | Edelman et al. | 156/310 |
| 5,068,261 A | 11/1999 | Maruno et al. | 522/39 |
| 6,043,327 A | 3/2000 | Attarwala et al. | 526/259 |
| 6,576,081 B1 * | 6/2003 | Date et al. | 156/310 |

FOREIGN PATENT DOCUMENTS

| | | |
|---|---|---|
| EP | 0 096 500 | 12/1983 |
| EP | 0 452 540 | 4/1990 |
| EP | 452540 A * | 10/1991 |
| EP | 0 239 351 | 9/1997 |
| JP | 53-144760 | * 12/1978 |
| JP | 59-91165 A * | 5/1984 |

* cited by examiner

*Primary Examiner*—Robert Sellers
(74) *Attorney, Agent, or Firm*—Robert M. O'Keefe; O'Keefe, Egan & Peterman, LLP

(57) ABSTRACT

This invention concerns an acrylate adhesive that cures at room temperature and has excellent dimensional stability. The adhesive may be used in applications such as for fiber optic connectors. The adhesive may be made by curing a two-part system or by use of a primer-based system. The two part system may include an adhesive part A, which may include one or more monofunctional, difunctional, or trifunctional acrylate or methacrylate monomers, a peroxide or hydroperoxide free-radical initiator, an antioxidant, and optionally, additives such as thickeners, thixotropes, and adhesion promoters; and an activator part B, which may contain a N,N-disubstituted aromatic amine, a difunctional methacrylate monomer, an antioxidant, and optionally, additives such as thickeners, thixotropes, and adhesion promoters.

10 Claims, No Drawings

ROOM TEMPERATURE CURED HIGH TEMPERATURE AND LOAD DIMENSIONALLY STABLE ACRYLATE ADHESIVES

This application is a continuation of application Ser. No. 09/881,587, filed Jun. 14, 2001, U.S. Pat. No. 6,734,249 which claims priority to U.S. Provisional Patent Application Ser. No. 60/211,856, filed Jun. 14, 2000.

Subject to rights of the assignee afforded under a Small Business Innovation Research program, the U.S. Government has a paid-up license in this invention and the right in limited circumstances to require the patent owner to license others on reasonable terms as provided for by the terms of DOD SBIR Project N96-263 and Naval Surface Warfare Center Contract #N00178-97-C-3006 awarded by the Department of the Navy.

BACKGROUND OF INVENTION

This invention pertains to a room-temperature fast-curing acrylate adhesive useful for structural applications including fiber optic connector assembly.

Presently, various methods are used to affix an optical fiber in a fiber optic connector so that the fiber does not move over time and during use. Movement of the fiber is problematic due to the potential for signal loss when two connectors are in alignment. One common method of securing the optical fiber in the connector is through use of an epoxy resin. Epoxy resins, however, are typically cured at high temperature when securing fibers in the connector. This adds cost to the installation process in that ovens are needed to effect curing at a reasonable rate. Typically, the curing occurs at 120° C. for about twenty minutes. The present inventors have recognized that a need exists for an adhesive which cures at room temperature to afford stable connections. The present inventors have determined that a solution to this problem would be highly desirable.

In an effort to find a solution to the problem, it was decided to investigate acrylate adhesives.

Acrylate adhesives are well known. For instance, U.S. Pat. No. 5,865,936, R. Edelman and W. J. Catena, describes the formulation of rapid curing two-part structural acrylate adhesives using a first part consisting of a mixture of acrylate and methacrylate monomers or oligomers, maleic acid, a hydroperoxide, and a source of ferric ions. A second part, the activator, is a substituted dihydropyridine.

U.S. Pat. No. 4,126,504, L. E. Wolinski and P. D. Berezuk, describes a fast-curing acrylate adhesive comprising of an elastomer dissolved in acrylate or methacrylate monomers initiated by benzoyl peroxide that is activated with a tertiary amine in the presence of an oxidizable heavy metal.

U.S. Pat. No. 4,112,013, P. C. Briggs, Jr. and L. C. Muschiatti, describes a room-temperature curing adhesive containing various acrylate monomers polymerized in the presence of a high amount (>20%) of either chlorosulfonated polyethylene or a mixture of chlorinated polyethylene and sulfonyl chloride. The method utilizes a peroxide as a free-radical generator, an organic salt of a transition metal as a promoter, an aldehyde-amine condensation product as an accelerator, and a tertiary amine as an initiator. These adhesives may be formed as a two-component system or as a primer system. A similar method for room-temperature cure adhesives is described in U.S. Pat. No. 4,263,419 by G. Piestert and H. G. Gilch.

However, the present inventors recognized that none of these references discloses an acrylate adhesive that cures at room temperature and is dimensionally stable under load. The present inventors recognized that a need existed for such an adhesive.

SUMMARY OF INVENTION

This invention solves one or more of the problems and disadvantages described above. This invention provides a room-temperature fast-curing acrylate adhesive useful for structural applications including fiber optic connector assembly. The adhesive may either be a two-component system or a primer-based system in which the surfaces to be bonded are primed before the adhesive is applied. The adhesives exhibit high modulus, low water absorptivity, excellent adhesion, and high glass transition and heat deflection temperatures. The most important and unexpected characteristic of these room temperature cured acrylate adhesives is the dimensional stability of the adhesive under load and at elevated temperature.

In one broad respect, this invention is a two-part adhesive system which may comprise:
 (a) an adhesive part A which may be comprised of:
  one or more monofunctional, difunctional, or trifunctional acrylate or methacrylate monomers,
  a peroxide or hydroperoxide free-radical initiator,
  an antioxidant such as of the quinone family, and
  optionally, additives such as thickeners, thixotropes, and adhesion promoters;
 (b) an activator part B which may be comprised of:
  a N,N-disubstituted aromatic amine,
  a difunctional methacrylate monomer,
  an antioxidant such as of the quinone family, and
  optionally, additives such as thickeners, thixotropes, and adhesion promoters.

Each of the parts of the system is mixed to form a substantially homogeneous composition prior to use. When the two parts of this system are mixed, reaction occurs to form the resulting adhesive. That is, a reaction product forms when the two parts of the system are mixed to initiate curing. Advantageously, this curing can occur at room temperature. The reaction product (which may be referred to as the cured adhesive) resulting from the admixture of part A and part B has excellent dimensional stability and affords an excellent material to use as an adhesive for fiber optic connectors.

In another respect, this invention is a primer-based adhesive system which may comprise:
 (a) an adhesive part A which may be comprised of:
  one or more monofunctional, difunctional, or trifunctional acrylate or methacrylate monomers,
  a peroxide or hydroperoxide free-radical initiator,
  an antioxidant such as of the quinone family, and
  optionally, additives such as thickeners, thixotropes, and adhesion promoters;
 (b) a primer part B which may be comprised of:
  a N,N-disubstituted aromatic amine,
  an adhesion promoter, and
  a solvent.

In another embodiment, the primer-based adhesive system may comprise:
 (a) an adhesive part A which may be comprised of:
  one or more monofunctional, difunctional, or trifunctional acrylate or methacrylate monomers,
  a N,N-disubstituted aromatic amine,
  an antioxidant such as of the quinone family, and optionally, additives such as thickeners, thixotropes, and adhesion promoters;

(b) a primer part B which may be comprised of:
a peroxide or hydroperoxide free-radical initiator, and a solvent.

In the primer based systems, part A and part B are each mixed prior to use. When a given surface is to be joined to another surface, the primer is first applied and the solvent allowed to evaporate. The A part is then applied onto the primed surface, whereupon the reaction is initiated to form the final adhesive product. The second surface is contacted with the adhesive before it completely cures. Normally, the second surface will be pressed against the first surface immediately after the A part is applied to the primed surface. Alternatively, the A part can be applied to the second surface and then pressed against the primed surface.

The type of substrates and surfaces on which the adhesive of this invention may be used vary widely. For example, the type of surfaces that can be treated with the adhesives of this invention includes glass, ceramics, metals, and plastics. A particularly advantageous use is in the fiber optic application. In this case, for instance, the two-part system of this invention is mixed and injected into the ferrule of a connector. Then, the optical fiber is inserted into the ferrule. The ferrule is often made of metal and/or a ceramic material. The adhesive is allowed to cure, which sets the fiber in place within the connector.

In another broad respect, this invention is the reaction product of each of two-part composition and the primer compositions. That is, this invention includes the reaction product (the cured adhesive) resulting from the curing of the admixture of part A and part B in the embodiments of this invention. In yet another broad respect, this invention is a process useful for adhering one surface to a second surface, which comprises applying a primer part B as described above to the first surface, allowing the solvent to evaporate so that the initiator (or activator) is on the first surface, applying the part A to the primed surface, pressing the first surface to the second surface so that the adhesive is sandwiched between the two surfaces until the adhesive is cured. Alternatively, the adhesive part A can be applied to the second surface in an area complementary to the placement of the primer part B, and then the two surfaces are pressed together so that part A and part B come into contact. In another broad respect, this invention is a process useful for adhering a first surface to a second surface which comprises mixing the A part and the B part of the two-part formulation described above, applying the admixture to a first surface, pressing the second surface to the first surface so that the adhesive is between the two surfaces for a time sufficient to effect curing of the adhesive. In another broad respect, this invention is a process useful for adhering one surface to a second surface, which comprises: applying a primer part B to the first surface, wherein the primer part B comprises a N,N-disubstituted aromatic amine, an adhesion promoter, and a solvent, allowing the solvent to evaporate so that the activator is on the first surface, applying a part A to the primed surface, wherein the part A comprises one or more monofunctional, difunctional, or trifunctional acrylate or methacrylate monomers, a peroxy initiator, and an antioxidant, pressing the first surface to the second surface so that the part A and part B are in contact and sandwiched between the two surfaces until the part A and part B have cured. In another broad respect, this invention is a process useful for adhering one surface to a second surface, which comprises: applying a primer part B to the first surface, wherein the primer part B comprises a primer part B, which comprises: a peroxide or hydroperoxide free-radical initiator, and a solvent, allowing the solvent to evaporate so that the activator is on the first surface, applying a part A to the primed surface, wherein the part A comprises one or more monofunctional, difunctional, or trifunctional acrylate or methacrylate monomers, a N,N-disubstituted aromatic amine, and an antioxidant, pressing the first surface to the second surface so that the part A and part B are in contact and sandwiched between the two surfaces until the part A and part B have cured.

In another broad respect, this invention is a process useful for adhering a first surface to a second surface which comprises: mixing a part A and a part B to form an admixture, wherein the part A, which comprises: a monomer selected from the group consisting of a monofunctional acrylate monomer, a difunctional acrylate monomer, a trifunctional acrylate monomer, a monofunctional methacrylate monomer, a difunctional methacrylate monomer, a trifunctional methacrylate monomer, or a combination thereof; a peroxide or hydroperoxide free-radical initiator; and an antioxidant; and wherein the part B comprises: an activator part B, which comprises: a N,N-disubstituted aromatic amine, a difunctional methacrylate monomer, an antioxidant, applying the admixture to a first surface, pressing the second surface and the first surface together so that the admixture is between the two surfaces for a time sufficient to effect curing of the admixture.

In another broad respect, this invention is a process useful for setting an optical fiber within an optical fiber connector that includes a ferrule for insertion of the optical fiber, comprising: mixing a part A and a part B to form an admixture, wherein the part A, which comprises: a monomer selected from the group consisting of a monofunctional acrylate monomer, a difunctional acrylate monomer, a trifunctional acrylate monomer, a monofunctional methacrylate monomer, a difunctional methacrylate monomer, a trifunctional methacrylate monomer, or a combination thereof; a peroxide or hydroperoxide free-radical initiator; and an antioxidant; and wherein the part B comprises: an activator part B, which comprises: a N,N-disubstituted aromatic amine, a difunctional methacrylate monomer, an antioxidant, injecting the admixture into the ferrule of a connector, inserting an optical fiber into the ferrule, and allowing the admixture to cure to thereby set the fiber in place within the connector.

In another broad respect, this invention is a process useful for setting an optical fiber within an optical fiber connector that includes a ferrule for insertion of the optical fiber, comprising: applying a part B primer to the fiber, wherein the primer part B comprises a N,N-disubstituted aromatic amine, an adhesion promoter, and a solvent, allowing the solvent to evaporate, and subsequently injecting a part A adhesive into the ferrule, wherein the part A comprises one or more monofunctional, difunctional, or trifunctional acrylate or methacrylate monomers, an initiator, and an antioxidant, followed by inserting the primed optical fiber into the ferrule, and allowing the part A and part B to cure to thereby set the fiber in place within the connector. In yet another broad respect, this invention is a process useful for setting an optical fiber within an optical fiber connector that includes a ferrule for insertion of the optical fiber, comprising: applying a part B primer to the fiber, wherein the primer part B comprises a peroxide or hydroperoxide free-radical initiator, and a solvent, allowing the solvent to evaporate, and subsequently injecting a part A adhesive into the ferrule, wherein the part A comprises one or more monofunctional, difunctional, or trifunctional acrylate or methacrylate monomers, a N,N-disubstituted aromatic amine, and an antioxidant, followed by inserting the primed optical fiber into the ferrule, and allowing the part A and part B to cure to thereby set the fiber in place within the connector.

As used herein, the curing of the admixture of part A and part B forms the final adhesive product, which may also be referred to as a reaction product herein.

Advantageously, the adhesive formulations described herein cure at room temperature, eliminating the need for post-curing at elevated temperature as is the standard current practice for the fiber optic connector application. The primer-based adhesive formulations are advantageously used in applications where the bond thickness of the adhesive layer is less than 5 µm, such as is found in the fiber-ferrule assembly of a fiber optic connector.

The cured acrylate adhesives may have adhesion strengths ranging from 700–800 psi when subjected to lap-shear testing between two aluminum substrates as described in ASTM D1002. Water absorption for the adhesives were determined to typically be less than about 1 percent when tested for 24 hours at room temperature. The creep moduli of the acrylates at 95° C. may be greater than 100 ksi, and the heat deflection temperatures may exceed 100° C. Glass transition temperatures for the adhesives are generally greater than 90° C. Shelf lives of the adhesive formulations may be a minimum of twenty-four months at room temperature. Viscosities of the uncured adhesives generally fall within the range of from about 50 to about 4000 cps using a Brookfield viscometer at 25° C. using an LV 3 spindle.

The acrylate formulations described here have outstanding dimensionally stability at elevated temperature and under load. They perform well in the fiber pushback, fiber pistoning, and static load tests for fiber optic connectors, and provide for an optical fiber movement of less than 0.2 µm (micron). The fiber pushback test consists of placing a 2 lb weight on a fiber-ferrule interface for 24 hours at 65° C., followed by comparisons of the final and baseline spherical heights of the optical fiber with respect to the ferrule endface. The fiber pistoning test examines the permanent movement of the fiber adhered inside the ferrule upon thermal cycling from −40° C. to 75° C. at a rate of 2° C./minute. The static load test consists of applying a fixed tensile load (104 grams) to an optical fiber and subjecting the assembly to 65° C. and 35% humidity for 168 hours, followed by comparisons of baseline and final endface geometries.

DETAILED DESCRIPTION OF THE INVENTION

Two-Component Systems

The monofunctional, difunctional, and trifunctional acrylate and methacrylate monomers of the adhesives may contain a wide range of one or more acrylate and/or methacrylate monomers including monofunctional monomers such as methyl methacrylate (MMA), methacrylic acid (MA), or isobornyl methacrylate (ISBM), difunctional monomers such as ethylene glycol dimethacrylate (EGDM), ethoxylated bisphenol A diacrylate esters (BPADAE), tetraethylene glycol dimethacrylate (TEGDM), diethylene glycol dimethacrylate (DEGDM), or diethylene glycol diacrylate (DEGDA), and/or trifunctional monomers such as tris (2-hydroxyethyl) isocyanurate triacrylate (ISO TRI). In addition, the monomers may be other alkyl (such as isodecyl, butyl, methyl, tetrahydrofurfuryl, and 2-ethylhexyl) or hydroxy alkyl (such as hydroxy ethyl and hydroxy propyl) esters of acrylic acid and methacrylic acid. The diacrylates and may also be of butyleneglycol, tetraethyleneglycol, polyethylene glycol, bisphenol A, ethoxylated bisphenol A, pentaerythritol, and the like.

In the overall two-component formulation, in one embodiment, the monomer, or combination of monomers, such as ethylene glycol dimethacrylate is present in any amount effective to provide an adhesive of this invention and, typically, is present in part A in an amount of from about 10 to about 99 percent based on weight. In general, the amount of difunctional methacrylate monomer (e.g., EGDM) may range from about 10 to about 80 percent based on weight, while other monomers are present in amounts ranging from about 5 to about 30 percent based on weight of the total formulation.

In the two-component embodiment of this invention, in one respect, the first part A contains a difunctional methacrylate monomer such as an alkylene glycol dimethacrylate such as EGDM and propylene glycol dimethacrylate, in addition to the one or more of the additional monomers listed above. Alkylene glycol dimethacrylates are well known. The amount of the alkylene glycol dimethacrylate can vary widely. In general, an effective amount of alkylene glycol dimethacrylate (the difunctional methacrylate monomer) may be used, such as from about 10 to about 75 percent by weight in the Part A formulation.

In addition, part A may also include oligomers such as hexafunctional urethane acrylate esters or aliphatic urethane esters present in amounts ranging from about 5 to about 75 percent by weight. These materials are known. They may be made by conventional methods.

Additional components of part A may include thixotropes. A representative example of such thixotropic agents is fused silica (available commercially under the trade names Cabosil M5 or Aerosil R972). Part A may also include one or more adhesion promoters, such as acrylated polyester oligomers, gamma-methacryloxypropyltrimethoxysilane, and tris-(ω)-methoxyethoxy)silane. Each of these components generally comprise only a small fraction of the formulation, typically being present in an amount of from about 0.1 to about 2 percent by weight.

Part A may also include a free-radical initiator, which may be either a peroxide, such as benzoyl peroxide (BPO), or a hydroperoxide, such as cumene hydroperoxide. The free-radical initiator may be present in any amount effective to effect initiation, and is generally in the range from about 0.1 to about 2 percent by weight of the Part A formulation. Part A of the composition may also contain an antioxidant, such as of the quinone class of compounds. Representative examples of compounds in the quinone class include hydroquinone and benzoquinone. The amount of antioxidant employed may vary widely, and in general is any amount needed to provide the desired an antioxidant effect. Typically the amount of antioxidant is an amount of from about 0.0001 to about 0.1 percent by weight, more typically is present in an amount less than about 0.02 percent by weight of the Part A formulation.

Part B of the two-component system includes an alkylene glycol dimethacrylate (a difunctional methacrylate monomer) such as EGDM or propylene glycol dimethacrylate, an optional thixotrope and an antioxidant as described above, and an activator for the peroxy free-radical initiator. Alkylene glycol dimethacrylates are typically present in Part B in amounts of 5.57 to 99 percent. The activator may be a tertiary aromatic amine such as N,N-dimethyl-p-toluidine (DMPT), N,N-dimethylaniline (NNDMA), N,N-diethylaniline, or 4,4'-methylenebis (N,N-dimethylaniline)

(MBNNDMA). The activator may be present in any effective amount, generally from about 0.5 to about 5.0 percent by weight of the Part B formulation.

In one embodiment of the invention, the amounts of ethylene glycol dimethacrylate that are present in parts A and B are varied such that the volume ratio of part A to part B is approximately 1:1.

Primer-Based Systems

For the primer-based systems, the percentages of the adhesive formulation (Part A) ingredients fall within the ranges specified for the two-component adhesive formulations. The adhesive part A consists of a monomer mixture comprised of one or more of the monomers, as well as an oligomer (optional), a thixotrope (optional), a peroxy free-radical initiator, and an antioxidant.

The activator part B (sometimes referred to in the industry as the "B-side") includes a solvent, typically of relatively high vapor pressure. The type of solvent used may vary depending on the ingredients of the B part. A representative example of a class of solvents useful in this regard is ketones such as 2-pentanone. Other solvent classes may include hydrocarbons, esters, alcohols, or other solvents capable of dissolving the components in the B part of the formulation. Generally, the amount of solvent employed is an amount sufficient to dissolve all the components of the B part.

The B part may also include a small amount of an adhesion promoter, such as described herein, in an amount up to about 0.2 percent. In addition, the B part may include a tertiary amine activator (such as a N,N-disubstituted aromatic amine) as previously described above. The amount of amine activator may be any effective amount, generally being from about 0.5 to about 5 percent, and in one embodiment from about 0.5 to about 3 percent.

Alternatively, the primer-based system may be formulated such that the peroxy initiator is present in the primer part B of the formulation. In this method, the adhesive part A would contain one or more of the specified monomers, an oligomer (optionally), a thixotrope (optionally), an antioxidant, and the tertiary amine activator. The primer part B would then contain the peroxy initiator dissolved in a solvent with a fairly high vapor pressure. The concentration of this solution is generally about 5 to about 15 percent by weight of the peroxy initiator.

The systems of this invention may include other compounds and components not specifically stated herein.

The following examples are illustrative of this invention and are not intended to be limit the scope of the invention or claims hereto. Unless otherwise denoted all percentages are by weight. In the tables, "aliphatic oligomer" refers to a aliphatic urethane esters and "hexafunctional oligomer" refers to a hexafunctional urethane acrylate esters.

EXAMPLE

Two Part Systems

This example illustrates adhesives of this invention. A two-component adhesive formulation containing an A part and a B part. The A-side (part A) of the formulation may contain the amounts of the components shown in Table 1, which include ethylene glycol dimethacrylate (EGDM), fumed silica (Cabosil-M5), N,N-dimethyl-p-toluidine (DMPT), and benzoquinone. The B-side (part B) of the formulation may contain the amounts of the components shown in Table 1, which include EGDM, ethoxylated bisphenol A diacrylate esters (BPADAE), isobornyl methacrylate (ISBM), fumed silica, benzoyl peroxide (BPO), and benzoquinone. The A part and the B part have equivalent volumes.

During use, the A and B parts may be placed into a two-component cartridge with plunger that is equipped with a static mixer in order to thoroughly mix the two components as they are dispensed. Alternatively, the A and B sides may be separated by a thin membrane in a two-part plastic package. Applying pressure will break the membrane and allow mixing of the two adhesive components (the A and B parts) before the application of the adhesive to a surface. In this application method, the volumes of parts A and B need not be equivalent, but thorough mixing is important.

TABLE 1

Various formulations for two-component adhesives containing the reaction product of part A and part B

| Component | Example 1 (weight % of component) | Example 2 (weight % of component) | Example 3 (weight % of component) |
|---|---|---|---|
| ISO TRI | 12.21 | 0 | 0 |
| BPADAE | 0 | 22.05 | 4.02 |
| EGDM | 13.46 | 26.09 | 24.42 |
| MA | 8.73 | 19.67 | 15.43 |
| MMA | 15.00 | 29.50 | 0 |
| BPO | 0.25 | 0.56 | 0.79 |
| DMPT | 0.35 | 0.46 | 0.49 |
| ISBM | 0 | 0 | 53.38 |
| Fumed silica | 0 | 1.67 | 1.47 |
| Hexafunctional oligomer | 0 | 0 | 0 |
| Aliphatic oligomer | 50.0 | 0 | 0 |
| Total | 100 | 100 | 100 |

TABLE 2

Two-component adhesive formulation

| Component | Weight grams | Weight % | Density g/cc | Volume cc |
|---|---|---|---|---|
| Part A (A side) | | | | |
| ISO TRI | 20 | 19.58 | 1.3 | 15.38 |
| EGDM | 21.47 | 21.01 | 1.04 | 20.64 |
| MA | 0 | 0 | 1.02 | 0 |
| MMA | 10 | 9.79 | 0.94 | 10.64 |
| BPO | 0 | 0 | 1.334 | 0 |
| DMPT | 0.7 | 0.68 | 0.937 | 0.747 |
| Aliphatic Oligomer | 50 | 48.94 | 2.2 | 0 |
| Total | 102.17 | 100 | | 91.81 |
| Part B (B Side) | | | | |
| ISO TRI | 4.42 | 4.52 | 1.3 | 3.4 |
| EGDM | 5.45 | 5.57 | 1.04 | 5.24 |
| MA | 17.46 | 17.85 | 1.02 | 17.12 |
| MMA | 20 | 20.44 | 0.94 | 21.28 |
| BPO | 0.5 | 0.51 | 1.334 | 0.375 |
| DMPT | 0 | 0 | 0.937 | 0 |
| Aliphatic Oligomer | 50 | 51.11 | 1.1262 | 44.40 |
| Total | 97.83 | 100 | | 91.81 |

EXAMPLE

Primer Based Systems

There will now be described an adhesive formulation that contains a primer and the monomer mixture. The monomer mixture includes 7.68 g (38.8 mmol) of EGDM, 1.23 g (2.6 mmol) of BPADAE, 0.50 g (2.30 mmol) of ISBM, 0.40 g (1.7 mmol) of BPO, and 0.06 g of fumed silica. The primer was a 2:1 ratio of solvent (2-pentanone) to activator (DMPT, or other substituted amine), along with 2% of an adhesion promoting oligomer such as an acrylated polyester (tradename CN704). The primer may be applied to the surfaces to be adhered to with a variety of applicators such as a cotton swab. Once the solvent has evaporated, leaving behind the adhesion promoter and the activator, the monomer mixture may be applied dropwise to the primed surfaces, which may then be pressed together until the adhesive has cured.

EXAMPLE

Primer Based Systems

Another primer-based formulation was prepared from an A part and a B part. The A part include 3.0 g (15.2 mmol) of EGDM, 1.5 g (7.0 mmol) of DEGDA, and 0.5 g (2.1 mmol) of DEGDM as monomers, and 0.06 g of fumed silica and 0.05 g (0.2 mmol) of an activator, 4,4'-methylenebis(N,N-dimethylaniline) ("4,4'-BMDMA"). The B part, a primer component, included 1.0 g (4.1 mmol) of benzoyl peroxide initiator dissolved into 8.0 g of solvent (2-pentanone). The primer may be applied to the surfaces to be adhered to by a variety of applicators, such as a cotton swab. The solvent is allowed to dry, leaving the peroxy initiator on the surface, and the adhesive part A may be applied to one or both of the primed surfaces. The surfaces are then pressed together for a time sufficient to allow the adhesive to cure. Another representative primer formulation is shown in the following table.

TABLE 3

Primer formulation with initiator in the primer (B) side

Part A (A Side) (Adhesive)

| Component | Weight grams | Weight % of A Side |
|---|---|---|
| EGDM | 6.0 | 58.72 |
| DEGDM | 1.0 | 9.78 |
| DEGDA | 3.0 | 29.35 |
| 4,4'-BMDMA | 0.10 | 0.98 |
| Fumed silica | 0.12 | 1.17 |
| Benzoquinone | 0.0005 | 0.005 |

Part B (B Side) (Primer)

| Component | Weight grams | Weight % of B Side |
|---|---|---|
| BPO | 1.0 | 11.1 |
| 2-Pentanone | 8.0 | 88.9 |

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as illustrative embodiments. Equivalent elements or materials may be substituted for those illustrated and described herein, and certain features of the invention may be utilized independently of the use of other features, all as would be apparent to one skilled in the art after having the benefit of this description of the invention.

What is claimed is:

1. A primer-based adhesive composition, comprising:
   (a) an adhesive part A, which comprises:
      one or more monofunctional, difunctional, or trifunctional acrylate or methacrylate monomers,
      from 0.1 to 2 percent by weight of fumed silica,
      a N,N-disubstituted aromatic amine, and
      an antioxidant, and
   (b) a primer part B, which comprises:
      a peroxide or hydroperoxide free-radical initiator, and
      a solvent.

2. The composition of claim 1 further comprising in part A, part B, or both part A and part B a thickener, a thixotrope, an adhesion promoter, or combination thereof.

3. The composition of claim 1 wherein for Part A the monomer is selected from the group consisting of methyl methacrylate, methacrylic acid, isobornyl methacrylate, ethylene glycol dimethacrylate, ethoxylated bisphenol A diacrylate esters, tetraethylene glycol dimethacrylate, diethylene glycol dimethacrylate, diethylene glycol diacrylate, tris(2-hydroxyethyl) isocyanurate triacrylate, an alkyl ester of acrylic acid, a hydroxy alkyl ester of acrylic acid, an alkyl ester of methacrylic acid, a hydroxy alkyl ester of methacrylic acid, butyleneglycol dimethacrylate, tetraethyleneglycol dimethacrylate, polyethylene glycol dimethacrylate, bisphenol A dimethacrylate, ethoxylated bisphenol A dimethacrylate, pentaerythritol dimethacrylate, and pentaerythritol trimethacrylate.

4. The composition of claim 1 wherein for Part A the N,N-disubstituted aromatic amine is present in an amount of from about 0.5 to about 3 percent.

5. The composition of claim 1 wherein the free-radical initiator is benzoyl peroxide (BPO), cumene hydroperoxide, or a combination thereof.

6. The composition of claim 1 wherein the solvent is a ketone, a hydrocarbon, an ester, an alcohol, or combination thereof.

7. A reaction product of part A and part B of claim 1.

8. The composition of claim 1 wherein the N,N-disubstituted aromatic amine is N,N-dimethyl-p-toluidine, N,N-dimethylaniline, or 4,4'-methylene bis (N,N-dimethylaniline).

9. The composition of claim 1 wherein the one or more monomers includes ethylene glycol dimethacrylate.

10. The composition of claim 1, wherein the solvent is a ketone.

* * * * *